Figure 1:
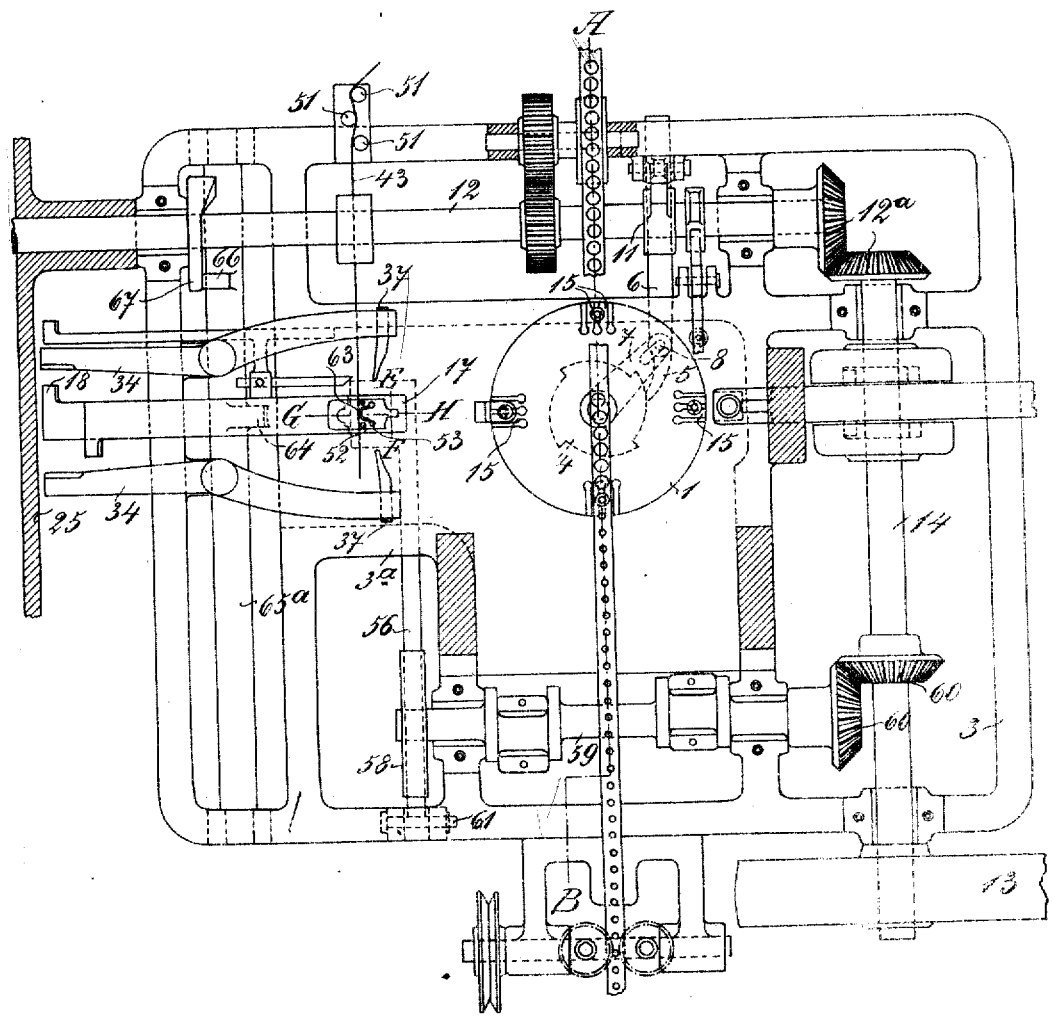

A. PRYM.
AUTOMATIC MACHINE FOR MANUFACTURING LOWER PARTS OF PRESS STUDS.
APPLICATION FILED JAN. 16, 1907.

921,160.

Patented May 11, 1909.
7 SHEETS—SHEET 1.

Witnesses:
Carl Ruß
Emil Kayser

Inventor:
August Prym
by Rouchryder
Attorney

A. PRYM.
AUTOMATIC MACHINE FOR MANUFACTURING LOWER PARTS OF PRESS STUDS.
APPLICATION FILED JAN. 16, 1907.

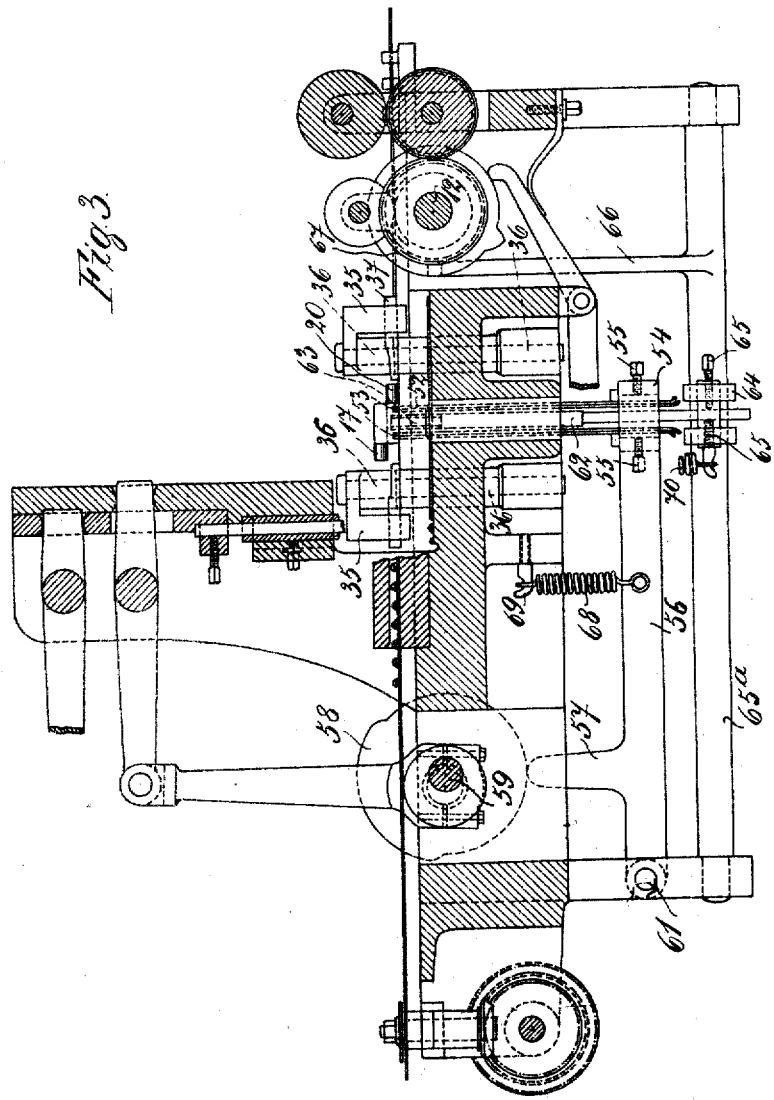

A. PRYM.
AUTOMATIC MACHINE FOR MANUFACTURING LOWER PARTS OF PRESS STUDS.
APPLICATION FILED JAN. 16, 1907.
921,160.
Patented May 11, 1909.
7 SHEETS—SHEET 4.
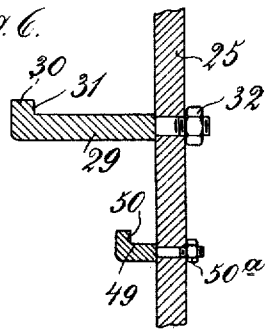
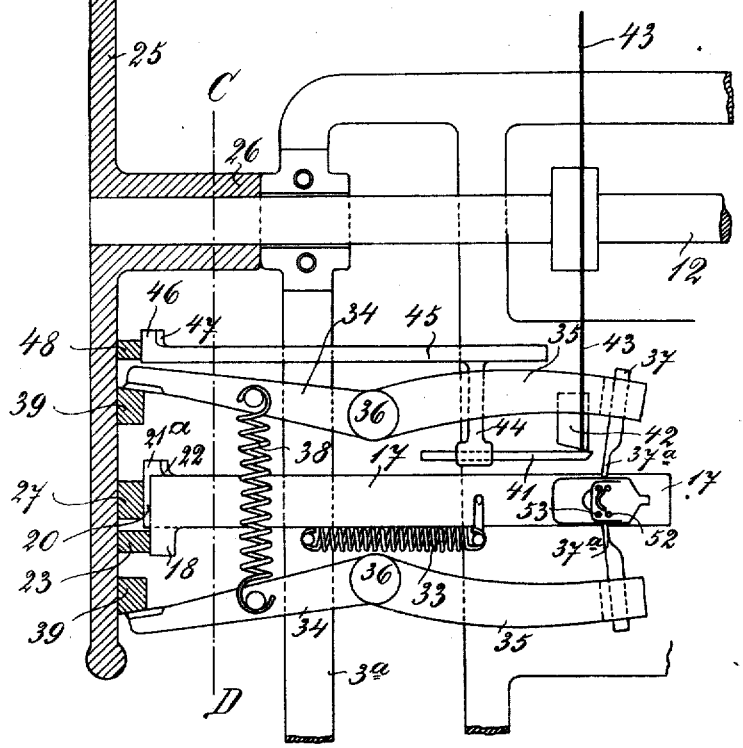
Witnesses:
Carl Ruß.
Emil Kayser.
Inventor:
August Prym
by [signature]
Attorney.

A. PRYM.
AUTOMATIC MACHINE FOR MANUFACTURING LOWER PARTS OF PRESS STUDS.
APPLICATION FILED JAN. 16, 1907.

921,160.

Patented May 11, 1909.
7 SHEETS—SHEET 5.

Witnesses:
Carl Ruß
Emil Kaysers

Inventor:
August Prym
by Robert Ziples
Attorney

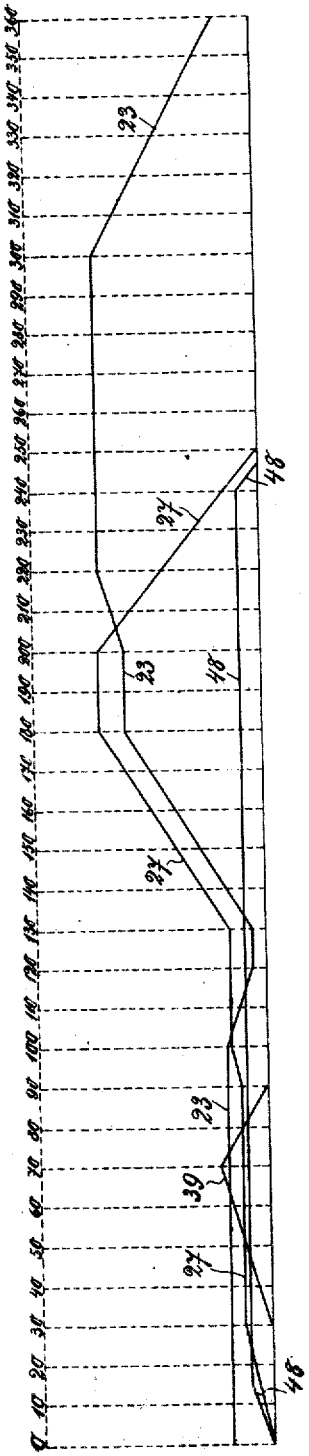

A. PRYM.
AUTOMATIC MACHINE FOR MANUFACTURING LOWER PARTS OF PRESS STUDS.
APPLICATION FILED JAN. 16, 1907.
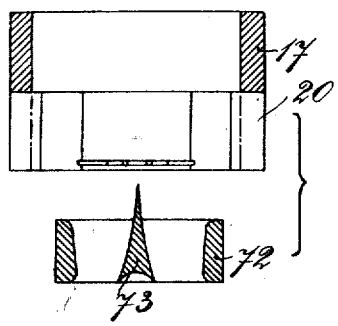
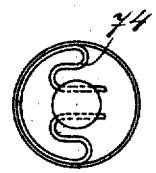
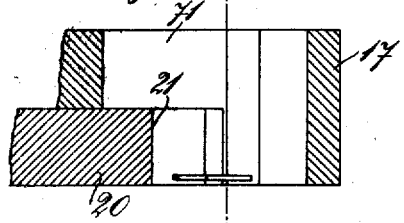
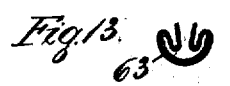
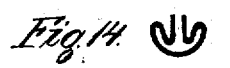
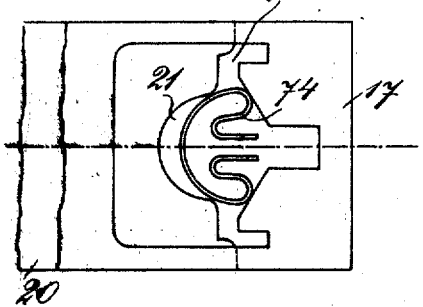

UNITED STATES PATENT OFFICE.

AUGUST PRYM, OF STOLBERG, GERMANY.

AUTOMATIC MACHINE FOR MANUFACTURING LOWER PARTS OF PRESS-STUDS.

No. 921,160.   Specification of Letters Patent.   Patented May 11, 1909.

Application filed January 16, 1907. Serial No. 352,543.

*To all whom it may concern:*

Be it known that I, AUGUST PRYM, a subject of the King of Prussia, German Emperor, and resident of Stolberg, in the Province of the Rhine, German Empire, have invented certain new and useful Improvements in Automatic Machines for Manufacturing Lower Parts of Press-Studs, of which the following is an exact specification.

My invention has for its object improvements in automatic machines for manufacturing lower parts of press studs or pressed buttons, more especially the combination of a rotating table or conveyer disk with an automatic device for bending a wire so as to impart to the latter a particular and convenient shape and to deliver or convey the bent wire to the said conveyer disk. This device or tool is adapted for bending the wire thus to form a crescent-shaped spring with two inner twice-bent shanks, the said table having attached thereto this bending device. The finished or bent spring is automatically conveyed from the bending tool itself to the rotating table and inserted into the socket of the lower part of the pressed button carried by the conveyer disk, in a condition of tension. It may be mentioned that it was heretofore known to produce the spring automatically, and to give it the crescent shape, but it has not yet been perceived how very important it was when pressed buttons were to be made in great quantities to convey the finished spring under tension to an automatic machine provided with the rotating table or conveyer disk, and to insert directly the bent spring into the socket of the lower part of the pressed button in a state of tension, so as to give the latter an absolutely secure position in the button.

Figure 2:
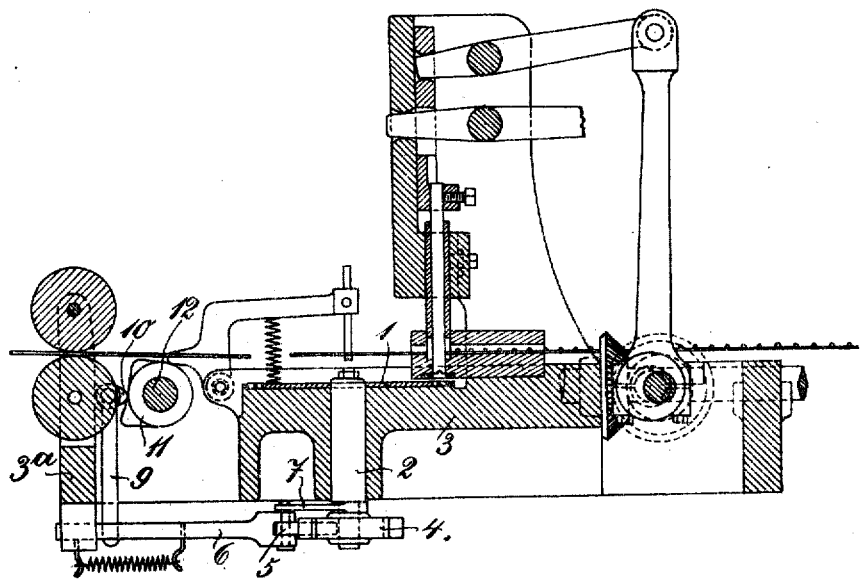
Figure 5:
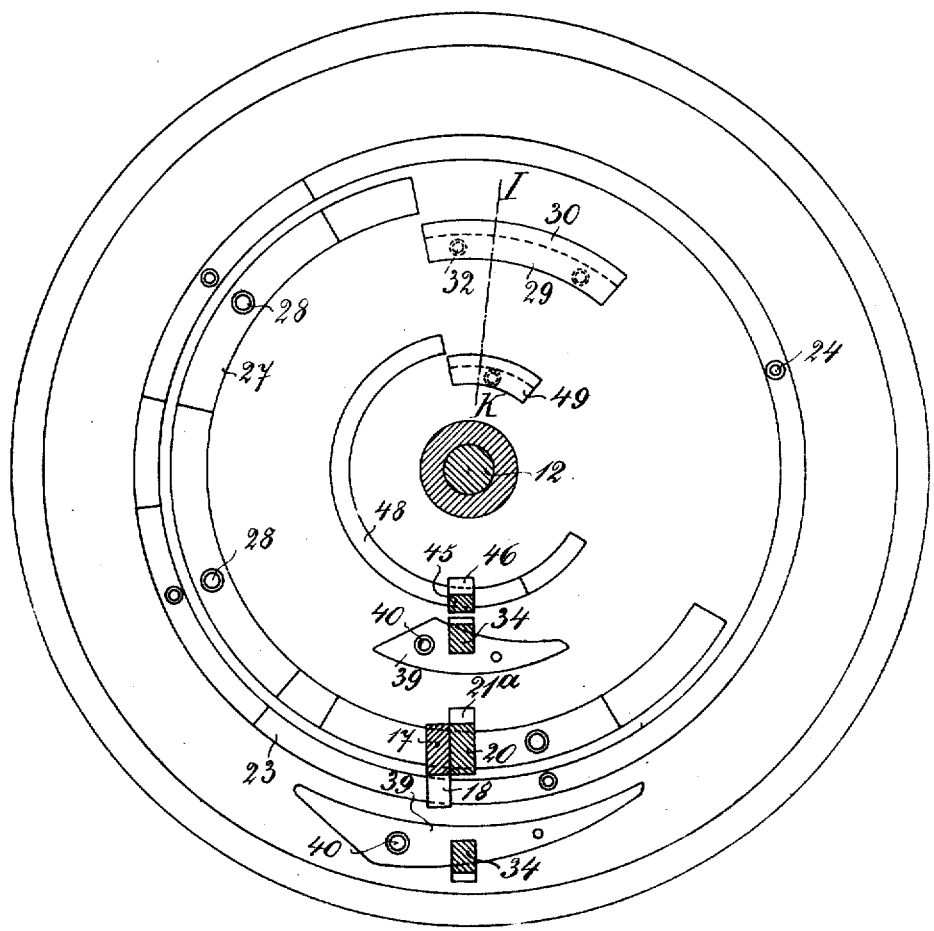

In order to make my invention more clear, I refer to the accompanying drawings, in which:

Figure 1 is a sectional plan view of the whole machine, Fig. 2 is a vertical cross-section on line A—B looking from the lefthand side in Fig. 1. Fig. 3 is a vertical cross-section on line A—B of the Fig. 1, the view taken to the lefthand side. Fig. 4 is a fragmentary sectional plan view of the bending tool, Fig. 5 is a section on line C—D of the Fig. 4, Fig. 6 is a detail section pertaining to Fig. 5, on line I—K of the latter. Fig. 7 represents a diagram which illustrates the manner of operating of the bending tool. Fig. 8 is a vertical section on line E—F of the Fig. 1, Fig. 9 is a fragmentary section on line G—H of the Fig. 1, Fig. 10 is a plan view of the Fig. 9, Figs. 11, 12, 13, 14 represent successive phases in the bending of the spring, Fig. 15 is a vertical section of the lower part of the pressed button after the insertion of the crescent spring has taken place. Fig. 16 is a plan view according to Fig. 15.

It may be pointed out that the arrangement serving for forming the socket part as illustrated in the Fig. 15 and the devices serving for finishing the lower part as illustrated in the Fig. 15 does not form part of the present invention. This arrangement is illustrated and described in a co-pending application filed together with the present one.

In the drawings (Figs. 1 and 2) 1 is a rotating table or conveyer disk. 2 is a vertically arranged shaft mounted in the machine table 3 and fixedly connected with the said conveyer disk. 4 is a ratchet wheel and 5 a pawl coöperating with said ratchet wheel.

6 is a rod pivotally connected with the pawl 5 and operated by the lever 7, which is loosely mounted on the shaft 2 and is provided with a slot in which the pivot 8 is located.

9 and 10 designate a double-armed lever hinged to the machine frame part 3ª and having its lower arm 9 engaging with the rod 6, and its arm 10 bearing against the cam 11. The cam 11 is mounted on the shaft 12 driven by means of the bevel wheels 12ª and the belt pulley 13 mounted on the shaft 14.

15 are elastic tongs provided in the rotating table 1 and adapted to receive the socket 16 of the lower part of the pressed button (see Fig. 15).

The bending tool, its construction and arrangement will now be described.

17 is a slide recessed on its righthand end (see Figs. 9 and 10) and having a projection or nose 18 (see Fig. 4). 20 is a second slide having the aforementioned slide 17 superposed and being provided with a half-circular recess 21 at its righthand end. (See Figs. 9 and 10.) On the lefthand side of the slide 20 a projection or nose 21ª (see Figs. 3 and 4) is arranged having an inclined face 22.

23 is a cam ring secured by means of screws 24 (Fig. 5) or the like to the disk 25 which is mounted with its hub 26 on the shaft 12. 27 is a second cam ring against which the lefthand end of the slide 20 abuts and which is secured to the disk 25 by means of screws 28 or the like.

29 is a segmental rim having a right-angled upper edge 30 (Fig. 6), the face 31 of which coöperates with the inclined face 22 of the slide 20. The part 29 is attached to the disk 25 by means of nuts 32.

33 is a spring secured with its one end to the machine frame 3ª and with its other end to the slide 17 (Fig. 4).

34 and 35 designate a double-armed lever pivotally secured to the machine table by means of the pivots 36 (see Figs. 3 and 4).

37 is a hammer-like tool or hammer secured to the righthand end of the arm 35 provided with a flattened part 37ª.

38 is a spring connected with both the arms 34 which bear with their outer ends upon segmental rims 39, which are provided with inclined faces for actuating at suitable times the arms 34. The segmental rims 39 are secured by means of screws 40 to the disk 25.

41 is a knife and 42 is a block serving as an abutment for the wire 43.

44 is an arm carrying the knife 41 and secured to the slide or rod 45, suitably mounted on the machine frame, and not further shown. The rod 45 is provided with a projection 46 having a rising face 47.

48 (Fig. 5) is a circularly curved ledge or tongue, which operates the rod 45 and the knife 41.

49 (Fig. 6) is a curved angle hook the part 50 of which coöperates with the rising face 47 of the projection 46. The part 49 is attached to the disk 25 by means of the nut 50ª (see Fig. 6).

51 (Fig. 1) are several rollers which are suitably mounted in the machine frame and driven, and which serve for intermittently feeding the wire 43. This arrangement does not form part of my invention and therefore is only diagrammatically illustrated.

52, 53 are two pairs of rods or pins (see Figs. 1, 12 and Fig. 3) mounted in the machine table and 54 is a bearing to which the pins are all secured. The bearing 54 is secured by means of screw-bolts 55 to the lever 56, the projection or nose 57 of which bears against the cam disk 58 mounted on the shaft 59, driven by means of the bevel wheels 60 and the belt pulley 13. The lever 56 is pivotally secured by means of the pivot 61 to the machine frame (see Fig. 1).

62 is a rod provided at its upper end with a crescent part 63 (Figs. 1 and 13). The latter is adapted to enter between the pins 52, 53. The rod 62 passes through the opening in the middle of the bearing 54 and is connected at its lower end with the forked lever 64 (see Figs. 1 and 3) by means of the bolts 65. The lever 64 is connected with the rod 65ª pivotally mounted in the machine frame and provided with an upwardly projecting arm 66, the upper end of which bears against the cam disk 67. The latter is carried by the shaft 12.

68 is a helical spring attached with its one end to the lever 56 and with its other end to the hook 69 screwed into the machine table. The spring 70 is secured to the hooked bolt 65 with its one end, and to the machine table with its other end (not shown).

As will be seen from the Figs. 1 and 3, the pins 52, 53 and the crescent part 63 of the rod 62 are adapted to enter into the recesses 71 and 21 of the superposed slides 17 and 20 respectively.

72 is a guiding piece provided with a conical inner opening and connecting with a spreading peg 73. (Fig. 8.)

The operation of the machine is as follows:— The wire 43 is intermittently fed for a certain length by means of the rollers 51 and passes in the recess 71 between the superposed slides 17 and 20 (see Fig. 1). The slide 20 and the knife 41 are advanced by means of the cam ring 27 and the part 48 respectively (Figs. 5 and 6). This operation is diagrammatically illustrated in the Fig. 7, wherein 27 designates the rim developed and 48 the developed curved segment. It will be seen therefrom that the knife is advanced from 0 to 15 degrees, whereby the wire 43 is cut off to suitable length. After the wire is cut off the slide 20 moves forward alone in correspondence with a rotating arc of 30 degrees. At the same time the pins 52 occupy their lifted position (see Fig. 3) and the cut off wire is bent in the form as shown in Fig. 11. From 30 to 90 degrees the double-armed levers 34, 35 are influenced by the cam pieces 39, as will be seen from the curve 39 in the Fig. 7, which curve designates the development of the curved cam pieces 39. During this rotation of the cam pieces 39 the hammers 37 approach each other and enter with their flattened parts 37ª between the pins 52, 53 which are situated within the recesses of the slides 17 and 20. Then the hammers depart one from the other. The wire is bent in the shape as illustrated in the Fig. 12. During the further rotation of the disk 25 the hammers 37 and the knife 41 remain at rest till one revolution of the disk 25 is completed. From 90 to 100 degrees, as will be seen from the Fig. 7, the slide 20 is advanced farther, whereby the wire is bent in the form as illustrated in the Fig. 13. In this case the crescent part 63 coöperates with the half-circular recess 21 of the slide 20. During the revolution from 0 to 100 degrees the slide 17 is at rest, as to be seen from the curve 23, which denotes the development of the cam ring 23. From 100 to 120 degrees the slide 17 moves backward and the slide 20 is at rest, whereby a shape is imparted to the wire, as illustrated in the Fig. 14. In order to enable the slide 17 to be withdrawn by the spring 33, the pins 52, 53 and the crescent part 63 are lowered due to the interference of the cam 58 with the nose 57 and the arm 66 with the cam 67 respectively (Fig. 3).

The withdrawal of the pins 52 takes place after the revolution of the disk 25 from 30 to 90 degrees is completed, the withdrawal of the crescent part 63 takes place while the disk 25 rotates from 120 to 130 degrees. At the same time the slides 17 and 20 are at rest. The finished spring is held fast by the slides 17 and 20 and fed forward during the revolution of the disk from 130 to 180 degrees, till the spring is situated above the guide 72 (see Fig. 8).

From 180 to 200 degrees both the slides 17 and 20 are at rest, as will be seen from the Fig. 7, in which 23 designates the cam ring 23 of the Fig. 5, developed. From 200 to 250 degrees the slide 17 is somewhat advanced whereas the slide 20 moves backward. The spring is released from the slides and taken up by the spreading peg 73 of the guide 72, from which the spring will be conveyed by an arrangement as fully described and illustrated in my aforementioned co-pending application. The finished spring is designated by 74 in the drawings, see Figs. 10 and 16. The slide 20 is at rest from 250 to 300 degrees and is withdrawn due to the arrangement of the spring 33 from 300 to 360 degrees. The withdrawal of the slide 20 as taking place from 220 to 300 degrees is effected by means of the rising face 22 of the projection 21ª (see Fig. 4), which interferes with the face 31 of the segmental rim 29. From 220 to 360 degrees the slide is at rest and now both slides 17 and 20 are in the position for bending a new spring.

After the insertion of the spring 74 into the part 16 has taken place, the conveyer disk 1 is rotated by means of the pawl 5 which is operated by means of the rod 6 and the angle lever 9, 10. The short arm 10 of the latter is bearing against the cam disk 11 and subjected when the latter is rotated, to a swinging motion.

Having thus fully described the nature of my invention, what I desire to secure by Letters Patent of the United States is:—

1. A wire spring catch bending and delivery device for press button making machines, comprising a wire feeding and cutting mechanism, separately movable die-slides receiving the cut off wire lengths, said die-slides being arranged with a space between, pins adapted to be moved into said space and coacting with said slides to produce an initial bending of the cut off wire, hammers coacting with said pins and slides to finish the bending of said wires and means for moving said slides with the bent wire into position for delivery to the button blank, substantially as described.

2. A wire spring catch bending and delivery device for press button making machines, comprising wire feeding and cutting mechanism, two separately movable slides having coacting die-faces between which the cut off wire is led, pins movable into the space between said die and adapted to coact with one of said slides to produce the primary bending up of the wire ends substantially at right angles to the center part, two hammers simultaneously co-acting with the pins to double up the wire at the bent up parts, a crescent shaped member within said bent up ends and co-acting with one of the die-slides to curve the center part of the cut off wire and means for moving said slides together to the delivery point, where said wire is delivered to the button blank in the manner set forth.

3. In a device of the character described, the combination of a wire cutting device, two superimposed die slides adapted to receive the cut off wire lengths from said cutting device, a plurality of pins mounted to co-operate with said slides, two hammers adapted to operate simultaneously upon the wires held by said slides and pins and from opposite sides of the slides, and mechanism for operating said wire cutting device slides and hammers, substantially as set forth.

In witness whereof I have hereunto set my hand in the presence of two witnesses.

AUGUST PRYM.

Witnesses:
ALVESTO S. HOGUE,
AUGUST FUGGER.